(12) United States Patent
Ueno

(10) Patent No.: US 7,739,118 B2
(45) Date of Patent: Jun. 15, 2010

(54) INFORMATION TRANSMISSION SYSTEM AND INFORMATION TRANSMISSION METHOD

(75) Inventor: Kimio Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 715 days.

(21) Appl. No.: 11/141,031

(22) Filed: Jun. 1, 2005

(65) Prior Publication Data

US 2005/0267761 A1 Dec. 1, 2005

(30) Foreign Application Priority Data

Jun. 1, 2004 (JP) .............................. 2004-163319

(51) Int. Cl.
G06F 17/27 (2006.01)
G10L 11/00 (2006.01)
G10L 21/00 (2006.01)

(52) U.S. Cl. ........................... 704/277; 704/9; 704/270

(58) Field of Classification Search ................ 704/231, 704/270, 277, 9; 381/306; 379/67.1; 382/162, 382/173, 181, 254, 276, 312; 340/286.01, 340/815.4; 370/310, 464; 709/206; 705/52
See application file for complete search history.

(56) References Cited

U.S. PATENT DOCUMENTS

| | | | | |
|---|---|---|---|---|
| 5,535,119 | A * | 7/1996 | Ito et al. .......................... | 704/3 |
| 6,061,718 | A | 5/2000 | Nelson | |
| 6,539,354 | B1 * | 3/2003 | Sutton et al. ................. | 704/260 |
| 2002/0174213 | A1 * | 11/2002 | Ibaraki ........................ | 709/223 |
| 2002/0193983 | A1 * | 12/2002 | Tokieda et al. ................. | 704/2 |
| 2002/0193997 | A1 * | 12/2002 | Fitzpatrick et al. ........... | 704/270 |
| 2002/0198716 | A1 * | 12/2002 | Zimmerman ................. | 704/270 |
| 2003/0177008 | A1 * | 9/2003 | Chang ........................ | 704/255 |
| 2003/0187800 | A1 | 10/2003 | Moore et al. | |
| 2004/0078193 | A1 * | 4/2004 | Masuichi et al. ............... | 704/9 |

FOREIGN PATENT DOCUMENTS

| | | |
|---|---|---|
| DE | 199 56 852 | 5/2001 |
| DE | 100 63 825 | 5/2002 |
| EP | 845894 A2 * | 6/1998 |
| EP | 856980 A2 * | 8/1998 |

(Continued)

OTHER PUBLICATIONS

Yamada, A; Ohta, M. Visual text reader for virtual image communication on networks, IEEE First Workshop on Multimedia Signal Processing, 1997, 495-500.*

(Continued)

*Primary Examiner*—David R Hudspeth
*Assistant Examiner*—Justin W Rider
(74) *Attorney, Agent, or Firm*—Young & Thompson

(57) ABSTRACT

In this information transmission system, a first user terminal gains access to a business server through a communication network, to transmit a body text of an electronic mail in voice information there. The business server converts the voice information into text information, discriminates the information to be converted into a pictogram, from this information, and further converts it into a pictogram. A user of the first user terminal recognizes a destination from the mail body text and transmits an electronic mail including the pictogram/text mixed body text to, for example, a second user terminal. Also in a TV phone, the voice information is similarly converted into text information and pictogram and combined with an image, and displayed.

14 Claims, 13 Drawing Sheets

```
TO B
LAST NIGHT,
I WEPT 😢 AT 🎥
I WATCHED AFTER 🍴
LATER ✍
```

FOREIGN PATENT DOCUMENTS

| | | |
|---|---|---|
| JP | 5-206193 | 10/1993 |
| JP | 7-193647 | 7/1995 |
| JP | 11-055614 | 2/1999 |
| JP | 2001-155014 | 6/2001 |
| JP | 2001-211265 | 8/2001 |
| JP | 2002-318649 | 10/2002 |
| JP | 2002-342242 | 11/2002 |
| JP | 2003-046652 | 2/2003 |
| JP | 2003-150503 | 5/2003 |
| JP | 2003-202885 | 7/2003 |

OTHER PUBLICATIONS

Morishima, S; Harashima, H. "A media conversion from speech to facial image for intelligent man machine interface", IEEE Journal on Selected Areas in Communications vol. 9 Issue 4, May 1991, 594-600.*

Japanese Patent Office issued a Japanese Office Action dated Jul. 14, 2009, Application No. 2004-163319.

* cited by examiner

FIG. 3

PICTOGRAM CONVERSION TABLE 219

| | |
|---|---|
| 231 — USER ID | A |
| 232 — PICTOGRAM PREFIX | nn |
| 233 — PICTOGRAM POSTFIX | — |

| (READING) | (PICTOGRAM) | (TYPE) |
|---|---|---|
| EIGA, SHINE | 🎥 | "2" |
| KEIKI, KE- | 🍰 | "2" |
| SHOKUJI, KUU | 🍴 | "2" |
| NAKITURA | 😢 | "1" |
| BAIBAI | 👋 | "1" |
| ⋮ | ⋮ | ⋮ |

ADDRESS CONVERSION TABLE 223

| NAME | ELECTRONIC MAIL ADDRESS | PICTOGRAM CONVERSION |
|---|---|---|
| BI | b@honto.jp | POSSIBLE |
| IZUMI JUN | izu@uso.jp | POSSIBLE |
| YUSHIBA YASUO | yu@uso.jp | IMPOSSIBLE |
| KUDA TETUZOU | fu@uso.jp | POSSIBLE |
| ⋮ | ⋮ | ⋮ |

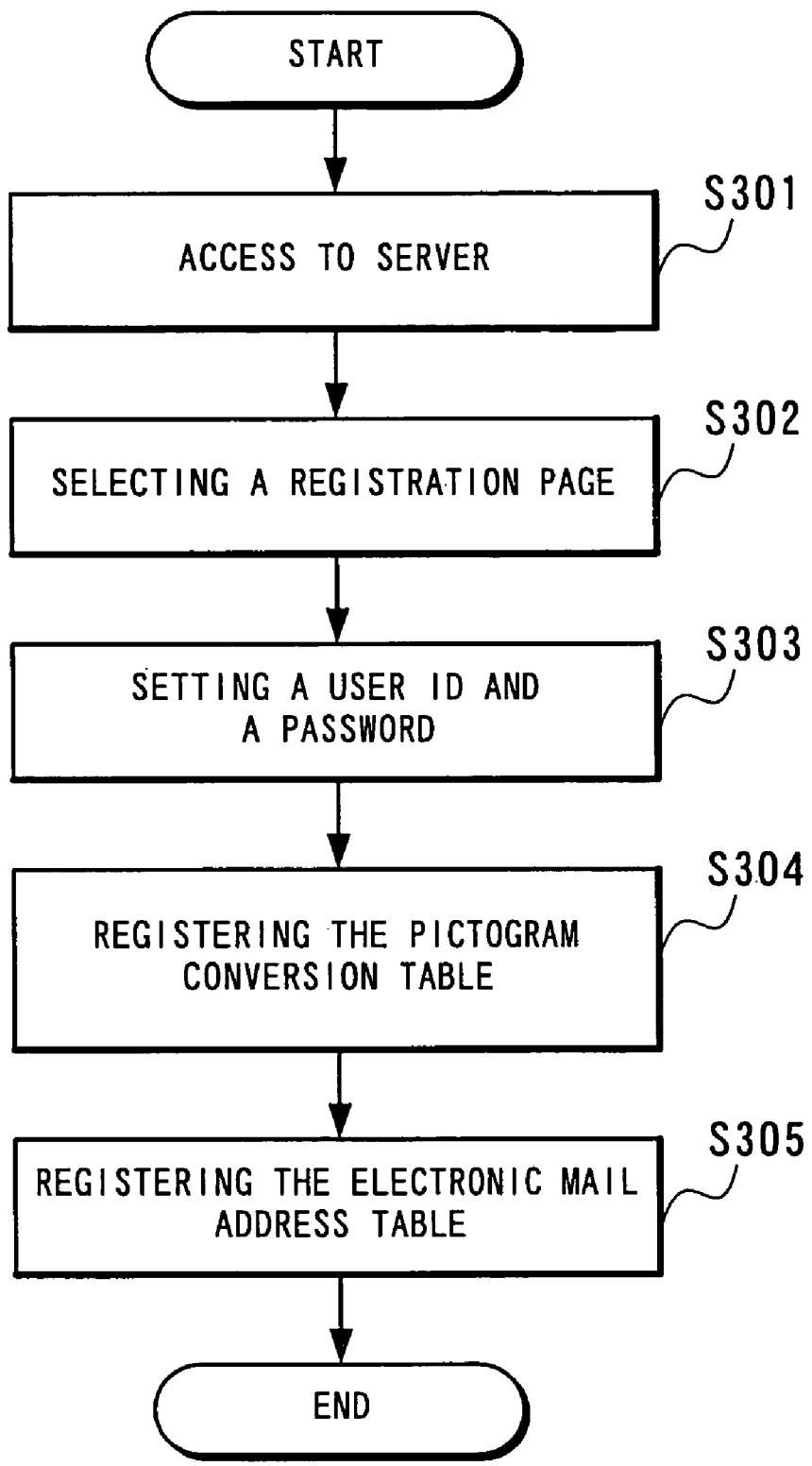

FIG. 8

TO B
LAST NIGHT,
I WEPT 😢 AT 🎥
I WATCHED AFTER 🍴
LATER 👋

FIG. 9

TO B
LAST NIGHT, I WEPT :nn: AT :nn:   — 232
THE MOVIE I WATCHED
AFTER :nn: DINNER
LATER :nn: BYE-BYE

FIG. 10

TO B
LAST NIGHT,                       242
I WEPT AT THE :MOVIE:
I WATCHED AFTER :DINNER:          241
LATER

INFORMATION TRANSMISSION SYSTEM AND INFORMATION TRANSMISSION METHOD

BACKGROUNDS OF THE INVENTION

1. Field of the Invention

The present invention relates to an information transmission system and an information transmission method suitable for a small-sized communication terminal such as a portable phone, and more particularly, to an information transmission system and an information transmission method capable of performing an easy input operation.

2. Description of the Related Art

Small-sized communication terminals including portable phone, PHS (Personal Handy-phone System), and PDA (Personal Digital Assistant) are in wide use for a private purpose and a business purpose. Especially, many of these communication terminals are respectively provided with a function of transmitting and receiving electronic mail.

The electronic mail requires input of body text and destination as the text information. The small-sized communication terminal has a few keys (buttons) on the data input portion because of its limited space of key arrangement. For example, in a portable phone, an input keyboard serves both as keys for entering text information and numeric keys for entering dial information. A user has to operate a plurality of keys as for one character when entering text in many cases, which makes the input work troublesome.

Then, a first proposal is made in which a voice corresponding to the contents of mail is entered from a portable phone, this is converted into the text information by a special voice recognition device connected to a communication network such as the Internet, and the information is stored into its storage as mail data (for example, refer to Japanese Patent Publication Laid-Open (Kokai) No. 2001-211265 (paragraphs 0017 and 0022, FIGS. 3 and 6)).

FIG. 16 shows the outline of a communication system according to the first proposal. A telephone terminal 101 is connected to a host 103 through a base station 102. The host 103 is connected to a voice recognition device 105 through the Internet 104. A voice recognition program is installed into the voice recognition device 105. A storage 106 is connected to the voice recognition device 105.

In the communication system 100 of the first proposal, when transmitting mail of text format from the telephone terminal 101, a user at first enters mail address and the like through a predetermined input operation, then enters the contents that should be the text mail, with voice, and transmits this to the voice recognition device 105 as voice mail. When receiving the voice mail on the side of the voice recognition device 105, the voice corresponding to the contents is converted into the text information and returned to the telephone terminal 101. A user modifies the text information received by the telephone terminal 101 depending on necessity and transmits this to the destination of the mail. In short, the telephone terminal 101 transmits the voice information of the mail body text to the voice recognition device 105 through the Internet 104, converts this voice information into the text information, and returns it. The telephone terminal 101 can modify the obtained text information properly and transmit it to the destination of the mail.

In this communication system 100 of the first proposal, when a user modifies the text information transmitted as the recognition result from the voice recognition device 105 to the telephone terminal 101, he or she has to do this through the operation of keys on the telephone terminal 101 itself. Therefore, the work of modifying a conversion mistake or partly rewriting the sentence itself is as troublesome and time-consuming as ever.

Then, a second proposal for making easy a whole text input operation of a user's portable terminal is made (for example, refer to Japanese Patent Publication Laid-Open (Kokai) No. 2003-46652 (paragraphs 0028 to 0030 and FIG. 3)).

FIG. 17 shows an important portion of a communication system according to the second proposal. In this communication system 120, a portable terminal 121 is connected to a voice recognition device 123 through a base station 122. When the portable terminal 121 enters the voice and transmits this to the voice recognition device 123 in order to create mail, the voice recognition device 123 converts this into the text information. The converted text information is transmitted from the voice recognition device 123 to a WWW (World Wide Web) server 125 on the Internet 124. The WWW server 125 displays this on a Web in a web description language.

The portable terminal 121 browses the text information in the web description language, which has been created by the WWW server 125, through access to the Internet 124. Modification of the text information is performed on the Web by using a radio button, not illustrated. Therefore, the modification work becomes easier.

As mentioned above, a way of saving the operation work by converting the voice information into the text information and then transmitting it as electronic mail, has been hitherto generally performed. Especially in the field of the portable phones, it is frequent practice to create mail body text having text information such as letter and character combined with pictogram. Use of the pictogram facilitates understanding of the transmission contents of electronic mail or the mood of a transmitting person. In order to create this body text including the pictogram, it is necessary to select some pictogram and enter the pictogram into the text information, and in this case, the processing of entering each pictogram individually through key operation has been required hitherto.

Although it is possible to enter text corresponding to the reading of a voice, since the pictogram is not a phonogram, there is no method of entering the pictogram in the text information. In order to enter a pictogram, it is necessary to specify a position to enter the pictogram in a sentence through the conventional key operation and specify the code information or display a list screen of the pictograms hence to specify and enter a desired pictogram individually. Accordingly, there still remains such a problem that operationality cannot be much improved on the whole because the pictogram cannot be entered with voice even though general text information can be entered easily through voice input and kana conversion of the voice analyzed.

SUMMARY OF THE INVENTION

An object of the invention is to provide an information transmission system and an information transmission method capable of positively using pictogram and facilitating its input operation.

According to one aspect of the invention, an information transmission system comprises a voice input unit which receives the contents of communication with voice, an information converting unit which converts the voice information received by the voice input unit into text information, a pictogram corresponding information extracting unit which extracts pictogram corresponding information indicating a pictogram from the text information obtained through the conversion by the information converting unit, and a pictogram converting unit which converts the pictogram corresponding information extracted by the pictogram corresponding information extracting unit into each corresponding pictogram.

In the preferred construction, the contents of communication correspond to a body text of an electronic mail.

In another preferred construction, the information transmission system further comprises an address table in which each pair of destination reading information including name of destination or reading of the name (designation) and address information corresponding to the destination is registered, an address table searching unit which searches the address table for proper one of the destination reading information, that corresponds to the information at a specified position of the text information received by the voice input unit and obtained through the conversion by the information converting unit, and a destination setting unit which sets the corresponding address information as the destination of the text information when the proper one of the destination reading information is found by the address table searching unit.

In another preferred construction, the information transmission system further comprises a type judging unit which judges whether each of the pictogram corresponding information to be converted by the pictogram converting unit is of a first type pictogram to put an accent on a usual sentence or a second type to replace itself with a specific word or sentence, and a pictogram conversion inhibiting unit which inhibits the conversion into a pictogram by the pictogram converting unit as for a destination of information where the above conversion is inhibited, deletes the text information corresponding to the first type pictogram, and leaves the text information corresponding to the second type pictogram as it is.

In another preferred construction, the information transmission system further comprises a language specifying unit which specifies a language corresponding to a destination, and a translating unit which translates the text information converted by the pictogram converting unit into the language specified by the language specifying unit.

In the above-mentioned invention, a body text of an electronic mail input with voice is converted into text information by the voice information/text information converting unit and the pictogram corresponding information indicating a pictogram is extracted from this text information obtained through the conversion. This pictogram corresponding information is converted into each corresponding pictogram, hence to obtain pictogram/text mixed information. In order to obtain a pictogram from the text information obtained through the conversion by the voice information/text information converting unit, there are a method of discriminating a pictogram according to the grammatical analysis of the text information and a method of extracting the information to be converted into a pictogram with the identification information included in the text information as a mark and discriminating a pictogram based on this information. In this invention, since the pictogram/text mixed information is obtained from the voice information, a troublesome input operation such as the conventional key input operation can be saved.

According to another aspect of the invention, an information transmission system comprises a voice input unit which receives the contents of communication with voice, an image input unit which receives image information that is the contents to be transmitted associated with the voice information received by the voice input unit, an information converting unit which converts the voice information received by the voice input unit into text information, a pictogram corresponding information extracting unit which extracts pictogram corresponding information indicating a pictogram from the text information obtained through the conversion by the information converting unit, a pictogram converting unit which converts the pictogram corresponding information extracted by the pictogram corresponding information extracting unit into each corresponding pictogram, and an information transmitting unit which combines the mixed information of pictogram and text obtained through the conversion by the pictogram converting unit with the image information received by the image input unit and transmits the above information.

In the preferred construction, the information transmission system further comprises an address table in which each pair of destination reading information including name of destination or reading of the name (designation) and address information corresponding to the destination is registered, an address table searching unit which searches the address table for the proper one of the destination reading information that corresponds to the information at a specified position of the text information received by the voice input unit and obtained through the conversion by the information converting unit, and a destination setting unit which sets the corresponding address information as the destination of the text information when the proper one of the destination reading information is found by the address table searching unit.

In another preferred construction, the information transmission system further comprises a type judging unit which judges whether each of the pictogram corresponding information to be converted by the pictogram converting unit is of a first type pictogram to put an accent on a usual sentence or a second type to replace itself with a specific word or sentence, and a pictogram conversion inhibiting unit which inhibits the conversion into a pictogram by the pictogram converting unit as for a destination of information where the above conversion is inhibited, deletes the text information corresponding to the first type pictogram, and leaves the text information corresponding to the second type pictogram as it is.

In another preferred construction, the information transmission system further comprises a language specifying unit which specifies a language corresponding to a destination, and a translating unit which translates the text information converted by the pictogram converting unit into the language specified by the language specifying unit.

In another preferred construction, the information transmitting unit, each provided correspondingly in a plurality of the voice input units, realizes a TV phone by exchanging images and the pictogram/text mixed information between users for every unit of the voice input units.

The above-mentioned invention can be used for the purpose of, for example, TV phone, or transmitting each image with each comment, and the pictogram/text mixed information obtained by the invention as set forth in claim 1 is combined with the image information input by the image input unit and transmitted. When transmitting a moving image, each image information forming it is supplied from the image input unit.

According to a further aspect of the invention, an information transmission method includes a voice input step for receiving the contents of communication with voice, an information converting step for converting the voice information received through the voice input step into text information, a pictogram corresponding information extracting step for extracting pictogram corresponding information indicating a pictogram from the text information obtained through the conversion in the information converting step, and a pictogram converting step for converting the pictogram corresponding information extracted through the pictogram corresponding information extracting step into each corresponding pictogram.

Further, in the above-mentioned invention, the contents to be transmitted is input with voice, the input voice information is converted into the text information, the pictogram corresponding information indicating a pictogram is extracted from the text information obtained through the conversion, and the extracted pictogram corresponding information is converted into each corresponding pictogram. Through these steps, the conventional troublesome key input operation can be saved.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is an explanatory view of a pictogram conversion table for every user according to the first embodiment;

FIG. 4 is an explanatory view showing one portion of an address conversion table for every user according to the first embodiment;

FIG. 5 is a flow chart showing the processing in the case where a user A performs user registration according to the first embodiment;

FIG. 8 is an explanatory view showing one example of the mail body text which a transmitting user of the electronic mail is supposed to create according to the first embodiment;

FIG. 9 is an explanatory view showing the case where the voice information of the mail body text shown in FIG. 8 is converted into the text information;

FIG. 10 is an explanatory view showing the state in which the electronic mail obtained through the processing of Step S351 is displayed;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Hereinafter, the details of the present invention will be described according to the embodiments.

Embodiment 1

Figure 1:
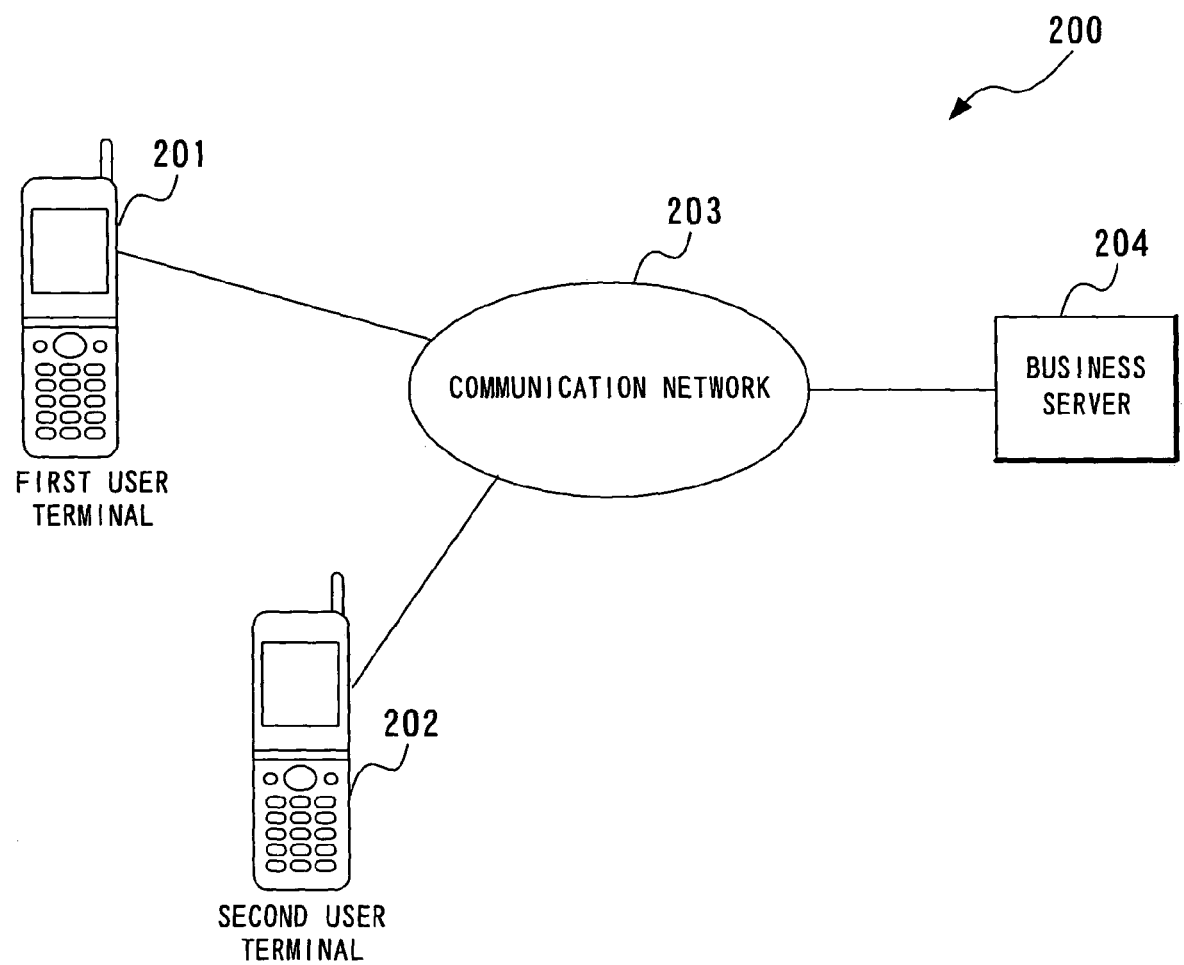
FIG. 1 is a constitutional view showing the outline of a communication system according to a first embodiment of the invention.

FIG. 1 shows the outline of a communication system according to a first embodiment of the invention. In this communication system 200, a first user terminal 201 that is the transmission source of the electronic mail and a second user terminal 202 that is the transmission destination of the electronic mail are connected to a communication network 203 including a mobile communication network and the Internet. The communication network 203 is connected to a business server 204 managed by a predetermined service provider. The business server 204 is a server with some application programs such as predetermined voice recognition software installed, and when receiving voice information, it recognizes this, creates the text information corresponding to the voice information, and converts one of the above into a pictogram.

Figure 2:
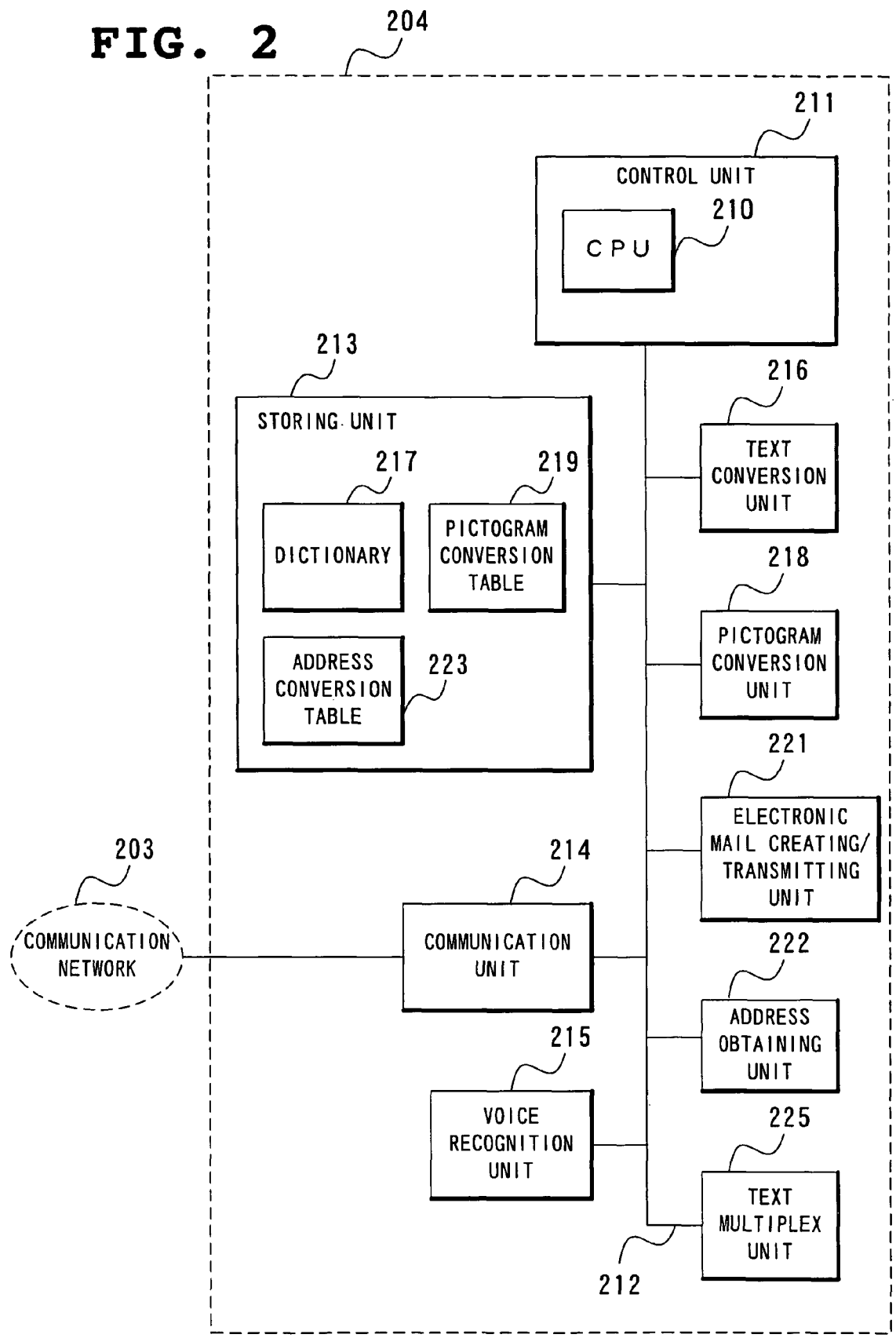
FIG. 2 is a block diagram of a business server according to the first embodiment.

FIG. 2 shows the structure of this business server functionally. The business server 204 is provided with hardware as a general server. A control unit 211 including a CPU (Central Processing Unit) 210 realizes some functional blocks by using the above application program stored in a storing unit 213 formed by a storing means such as a magnetic disk (not illustrated), which unit 213 is connected to a bus 212. In addition to this, various kinds of circuits or circuit function units are connected to the bus 212. A communication unit 214 transmits and receives data through the communication network 203. A voice recognition unit 215 is a circuit portion for recognizing the voice information. A text conversion unit 216 converts the recognized voice information into the corresponding text information by using a dictionary 217 stored in the storing unit 213. A pictogram conversion unit 218 converts a predetermined portion of the text information into a pictogram in accordance with word, icon, or symbol, by using a pictogram conversion table 219 for every user stored in the storing unit 213.

An electronic mail creating/transmitting unit 221 creates an electronic mail with predetermined information such as address of the electronic mail added to the mail body text and transmits this to the destination of the mail by using the communication unit 214. An address obtaining unit 222 extracts the name of a person from a predetermined portion of the text information which the text conversion unit 216 has converted the voice information into, by using an address conversion table 223 included in the storing unit 213 and obtains the address of the destination of the electronic mail corresponding to the extracted person's name. A text multiplex unit 225 multiplexes the other information, for example, video information, to the text information, depending on necessity.

The first user terminal 201 and the second user terminal 202 shown in FIG. 1 can be portable phones on the market. For the communication by electronic mail enabled by this embodiment, a user A of the first user terminal 201 that is the transmitting side, has to register itself into the business server 204 previously and obtain a user ID (Identification) and a password. In this registration, or in the later connection to the business server 204, he or she is to register each address of the electronic mail of each destination and pictogram used for the electronic mail.

FIG. 3 shows one example of the contents of the pictogram conversion table for every user. The pictogram conversion table 219 is created within the storing unit 213 shown in FIG. 2 on the side of the business server, according to the registration processing of the user on the transmitting side. Here, a user ID 231, a pictogram prefix 232 for identifying the head of a pictogram, a pictogram postfix 233 for identifying the end of a pictogram, and various pictograms are registered in correspondence with "how to read" and "type" described later, into a pictogram registration area 234. Except the user ID 231, each default data is stored into the pictogram conversion table 219 and the table remains effectively as it is as the pictogram conversion table 219 unless a user changes, adds, or deletes this.

For example, in the pictogram prefix 232, "nn" is initially prepared, which does not exist in the head of any Japanese word, and when a user pronounces this, it is found that a word corresponding to the pictogram is to be uttered subsequently. Some user may register also the word "pictogram starts" at this position or delete the initially registered word "nn". When the both words "nn" and "pictogram starts" are used in parallel, the pictogram conversion unit 218 shown in FIG. 2 recognizes the subsequent word right after this as a pictogram and regards this word as an object to be converted into the pictogram even when the converted text information by the text conversion unit 216 includes one of "nn" and "pictogram starts".

In the pictogram postfix 232, "-" (blank period of a predetermined time and more) is initially registered. In this embodiment, when a user utters the "reading" of a pictogram, the pictogram conversion unit 218 is to detect the time "blank" and therefore it can detect the end of the range of the object to be converted into a pictogram, without especially registering the word "pictogram ends" and uttering it. It is needless to say that a user may register the word "pictogram ends" and use it. Or, "-" (blank period of a predetermined time and more) may be registered in the pictogram prefix 232.

When many users utter voice, they often set a time blank between the words. Therefore, when "-" is used in the pictogram prefix 232, there is a possibility of moving into a mode of converting into pictogram against a user's will, except for the case of reading aloud a prepared sentence. Naturally, a blank time for the integral times of the time blank, like "--" or "---" can be set in the pictogram prefix 232, thereby converting it into the other "reading" such as "nn". Alternatively, it is possible to assign a specific key (including simultaneous input of a plurality of keys) of the keys of a portable phone to the pictogram prefix 232 or the pictogram postfix 232.

In the pictogram registration area 234, one or several readings are registered for every pictogram. Although a user can use the above "reading" or "readings" as the default, another "reading" may be added or some "reading" may be deleted. For example, when new "reading" is registered as for certain pictogram and it happens to overlap with the "reading" of the other pictogram, one of them can be deleted from the pictogram conversion table 219. When several "readings" are registered as for one pictogram, even when any of the readings may appear, the pictogram conversion unit 218 converts it into the corresponding pictogram. When a user is never expected to use some pictogram because of his or her generation, all the readings of the same pictogram are deleted, hence to inhibit the conversion into the same pictogram.

FIG. 4 shows one portion of the address conversion table for every user. The address conversion table 223 includes each correspondence between the destination name, which is to be uttered by a user on the transmitting side in the head portion of the mail, and the mail address. The address conversion table 223 of this embodiment can also register the possibility or impossibility of conversion into pictogram corresponding to the mail address. When creating the mail including a pictogram, a user on the transmitting side pronounces to specify the pictogram as apparent from the description of the pictogram conversion table 219 shown in FIG. 3. In this case, when there is the corresponding text information, naturally this is converted into a pictogram.

When electronic mail is broadcasted to some destinations, there may be the case where use of a pictogram is not preferable in some of the destinations or there may be a fear that the text information representing a pictogram or the control information of the pictogram prefix 232 and the like may be displayed in a text form as an error when a communication terminal which cannot handle the pictogram is set as one of the destinations. As for this destination, "impossibility" is registered in the column of the possibility/impossibility of conversion into pictogram, so that any pictogram will not be displayed as for the same destination. At this time, a control by "type" described later is performed.

FIG. 5 shows a flow of the processing when a user A performs user registration in this embodiment. User registration into the business server 204 is necessary for using the communication system 200 of this embodiment. At first, the user A gains access to the business server 204 by using the first user terminal 201 (FIG. 1) or a desktop computer or the same communication terminal, not illustrated (Step S301). The computer or the other operable communication terminal may be used for the user registration when the use of the above can do the user registration more easily than the use of the first user terminal 201 of portable type.

When the user A gains access to the business server 204, he or she selects a registration page for starting the use of the communication system 200 of this embodiment (Step S302). Then, he or she sets a user ID and a password to gain a new membership (Step S303). When the setting of the user ID and the password is assured by receiving the return mail of confirmation from the business server 204 in this state, the user A performs the registration processing of the pictogram conversion table 219 (Step S304).

Figure 6:
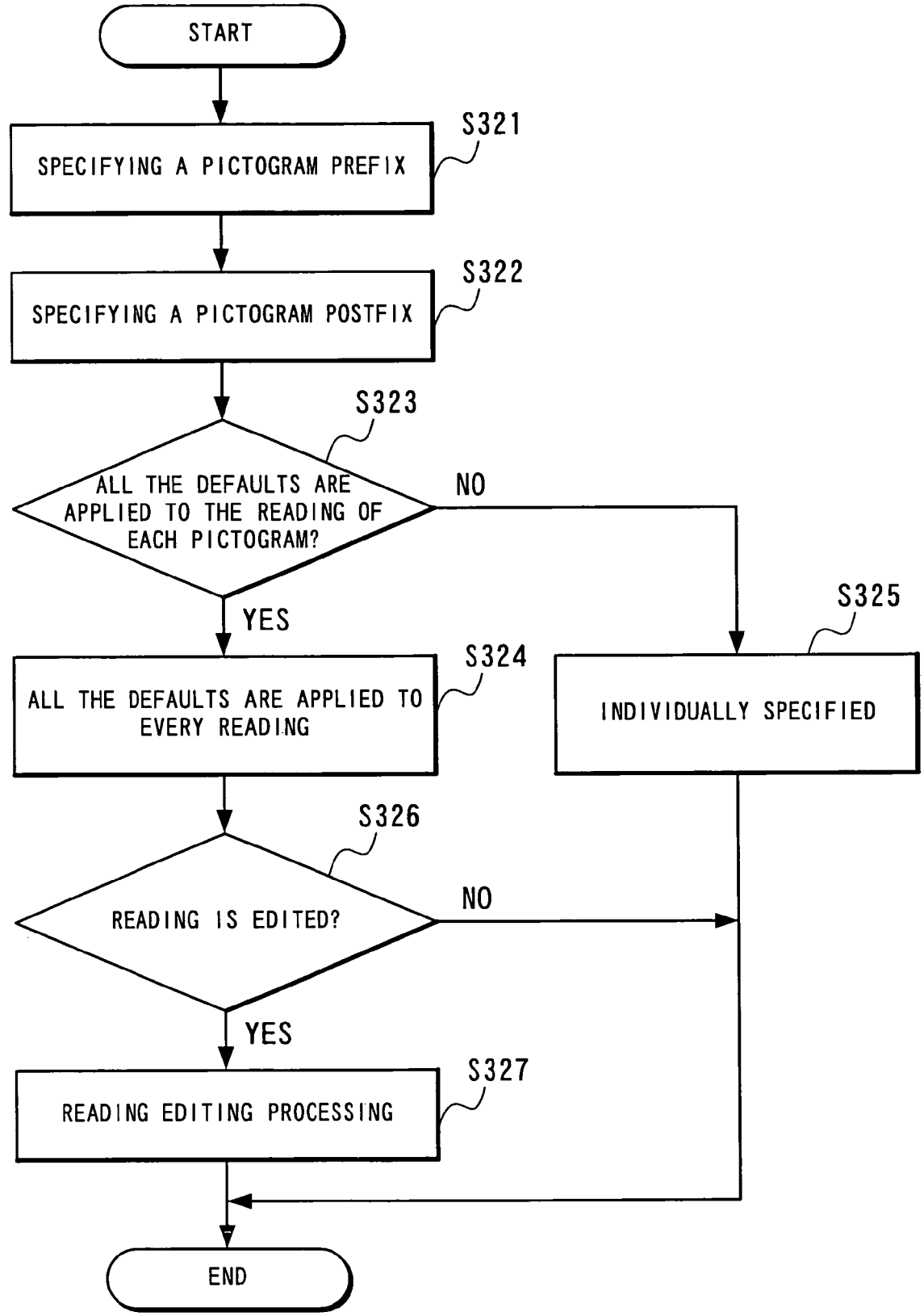
FIG. 6 is a flow chart showing the registration processing of the pictogram conversion table according to the first embodiment.

FIG. 6 shows the flow of the registration processing of the pictogram conversion table. In the pictogram conversion table 219 shown in FIG. 3, at first, the user A specifies the pictogram prefix he or she uses (Step S321), and then specifies the pictogram postfix (Step S322). As for the both, the defaults may be used as they are of the contents prepared by the business server 204 supposing the standard use mode.

As for the reading of each pictogram, the user A selects whether the defaults are all applied or not (Step S323). When the reading of each pictogram prepared by the business server 204 is used for the meanwhile, the user A is to select "all apply" (Y). Thus, the processing of applying all the defaults to the reading of each pictogram is performed (Step S324).

When no use of the defaults is selected (Step S323: N), the user A has to specify the reading with respect to each pictogram (Step S325). In this processing, as for the pictogram he or she doesn't like, input of the reading can be skipped, hence to do the processing of not using the above pictogram.

When the processing of applying all the defaults to the reading of each pictogram is selected in Step S324, the user A is asked whether one of them are changed to the other reading or whether the other reading is added or not (Step S326). When the user A wants this editing (Y), the editing processing of addition, change, and deletion is performed (Step S327), as described above. The editing processing itself can be always performed through log in to the business server 204 with specification of the user ID and the password. The return to the defaults is performed in the same way.

Returning to FIG. 5, the description is continued therefrom. When the user A finishes the registration processing of the pictogram conversion table 219 for every user, he or she performs the initial registration of the address conversion table 223 (FIG. 4) (Step S305). In the address conversion table 223, the name of destination and mail address can be naturally added or deleted or changed and the setting of the possibility of pictogram conversion can be naturally changed later. A user can skip the registration of the address conversion table 223. In this case, the user has to specify the mail address of the destination through a key operation as in the conventional way.

Figure 7:
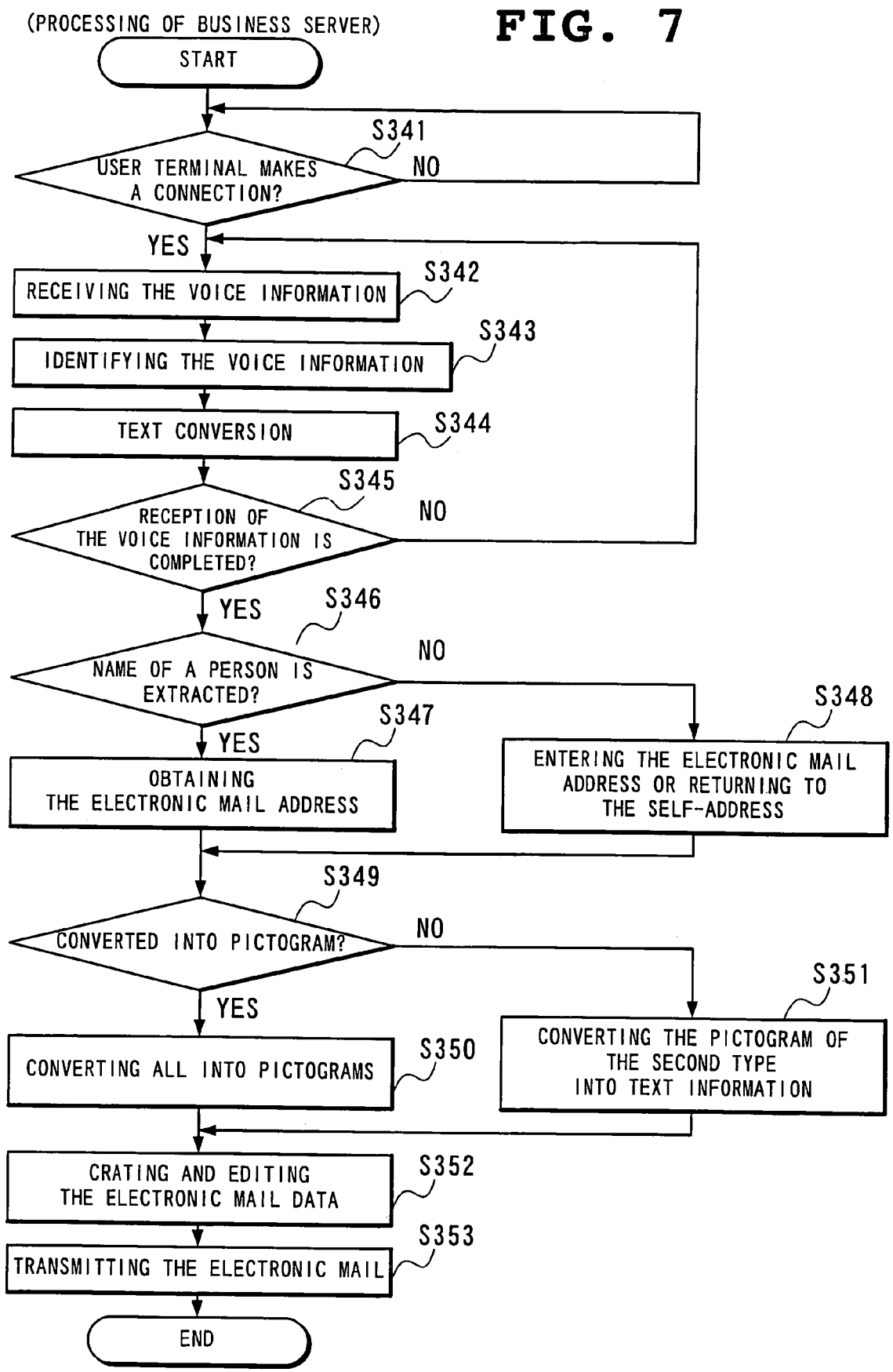
FIG. 7 is a flow chart showing the processing on the side of a business server when a user who has been registered according to the first embodiment creates and transmits electronic mail including pictogram.

FIG. 7 shows the flow of the processing on the side of the business server when a user having been registered creates and transmits the electronic mail including a pictogram. The business server 204 waits for a connection of the user terminal for transmitting the electronic mail (Step S341). The concrete processing will be described supposing that the user A transmits the electronic mail to the second user terminal 202 of the user B with the first user terminal 201.

When the first user terminal 201 makes a connection to the business server 204 (Y), the user A transmits the contents of the electronic mail with voice at this point. In the business server 204, the communication unit 214 shown in FIG. 2 receives this voice information (Step S342). Then, it temporarily stores this voice information into a working memory area, not illustrated, of the storing unit 213 and the voice recognition unit 215 recognizes the voice information by using the dictionary 217 (Step S343). As a result, the voice information is converted into the text information (Step S344) and stored in the working memory area.

The above processing is repeated by the unit of sentence or by the unit of basic block and the like while the user A is transmitting the voice information (Step S345: N), and it stops upon completion of receiving the voice information (Step S345: Y). Thus, the text information obtained by the conversion of the voice information obtained from the user A is stored into the working memory area of the storing unit 213. In order to convert the voice information each user transmits into the text information accurately, it is preferable that the training on the voice recognition of every user is required and that the obtained information is stored into the business server 204.

FIG. 8 is one example of the mail body text supposed by a transmitting person of the electronic mail and FIG. 9 shows that the voice information of the above mail body text being pronounced is converted into this text information. According to the communication system 200 of this embodiment, the user A as the transmitting party of the electronic mail has to enter the voice information indicating the destination user B at the head of the mail body text when transmitting the electronic mail including the pictograms as shown in FIG. 8.

Thereafter, the contents of the mail body text is sequentially pronounced depending on the setting contents of the pictogram prefix 232 and the pictogram postfix 233 as shown in FIG. 3 and this is transmitted from the first user terminal 201 to the business server 204 as the usual voice information. In this embodiment, the processing for specifying a transmitting destination is performed based on the voice information in a predetermined range from the head of the mail body text. When this processing is not performed, there is no need to enter the destination user's name at the head of the mail body text.

In the example shown in this embodiment, since the pictogram prefix 232 is set at "nn", the voice information following this pronunciation will be taken for pictogram every time this is detected. In this example, since the time blank "-" is to be entered instead of the recognition of the pictogram postfix 233, the pictogram conversion unit 218 converts it into a corresponding pictogram, in comparison with the text information from the respective "readings" to the blank. In the other portion, the text information is to be converted into a mixed sentence of Kanji and Kana, by using the dictionary 217 and the software for syntactic analysis, not illustrated.

Returning to FIG. 7, the description of the processing on the side of the business server 204 will be continued. Upon receipt of the text information as shown in FIG. 9, the business server 204 checks whether the user A as the transmitting party sets the destination of the electronic mail through the name detection from the address conversion table 223 (FIG. 4) (Steps S346). As described above, when the user on the side of transmitting the electronic mail does not register the address conversion table 223, the setting of the electronic mail destination through the name detection is not performed. Even when the address conversion table 223 is registered, it may be designed in that whether the destination of electronic mail is automatically detected or not is selectable when the user logs in to the business server 204.

When the name detection is performed in Step S346 (Y), the processing proceeds to Step S347, where the mail address is obtained according to the address conversion table 223. When it is not performed (Step S346: N), the user enters the mail address, or returns the own mail address (Step S348). Namely, in the latter case, when the user A finishes the utterance of the mail body text, the business server 204 requires the first user terminal 201 to enter the mail address. At this point, the user A enters the mail address of the user B through the key operation or selects the mail address of the user B from the address note initially stored in the first user terminal 201 as in the conventional way and transmits this to the side of the business server 204 as the data. When any destination is not specified, it returns the mail body text converted to the user A's terminal. This can improve the editing ability of the mail body text and refer to the telephone book within the terminal for the mail destination address, thereby decreasing the trouble.

When the acquisition or input of the mail address is finished, the CPU 210 within the business server 204 checks whether the text information is converted into a pictogram or not (Step S349). In this embodiment, since the area of a pictogram is specified according to the pictogram prefix 232, the text portion corresponding to a pictogram is converted into the pictogram in principle, as mentioned above. When the broadcasting destinations include a boss and the use of the pictogram is judged to be improper, it is possible to set the pictogram conversion not to work on such a destination.

The pictogram for use in this embodiment includes a first type to put an accent on a usual sentence and a second type to replace itself with a specific word or sentence. For example, in the example shown in FIG. 8, the pictograms indicating "meal" and "cinema" are of the second type and deletion of these from the sentence wouldn't make sense. On the contrary, the pictograms indicating "crying face" and "good-bye (bye-bye)" are of the first type and even the deletion of these from the sentence would make sense. When the pictogram conversion is specified (Step S349:Y), the corresponding text information is all converted into the pictograms (Step S350), and in the other case (Step S349: N), the pictogram of the second type is converted into text (Step S351). In the pictogram conversion table 219 shown in FIG. 3, the first type is shown as "1" and the second type is shown as "2".

FIG. 10 shows how the electronic mail obtained through the processing of Step S351 is displayed. The text information of the second type in the pictograms specified by the pictogram prefix 232 shown in FIG. 9 are respectively converted into Kanji character, 食事241 and 映画242. Needless to say, it is not always converted into Kanji but it is sometimes converted into Hiragana, Katakana, or symbol used in the usual sentence.

The first user terminal 201 (FIG. 1) is connected to the business server 204 in a state in which this pictogram conversion is performed. The user A can confirm the result of the pictogram conversion processing of Step S350 or Step S351 on a display screen of the first user terminal 201. Depending on necessity, the contents are modified when creating and editing the electronic mail data (Step S352). At this time, the sentence can be modified through a key operation as in the conventional way, or the voice information can be transmitted with the alteration specified, and converted into the text information as mentioned above and further into the corresponding pictogram.

When the electronic mail has been thus created, the user A operates the first user terminal 201 and transmits the electronic mail to the user B (Step S353). In broadcasting, an instruction of this effect is made and then, the electronic mail is transmitted to a plurality of destinations.

Possible Variation of the First Embodiment

In the first embodiment as described above, the text information to be converted into a pictogram is interposed between the pictogram prefix 232 and the pictogram postfix 233 (where, including a time blank of a predetermined time and more), hence to be distinguished from the text information to be converted into letters. Differently from this, the analysis result of a sentence and the table of the text information to be converted into a pictogram can be effectively used, in order to convert the corresponding text portion into a pictogram without using the pictogram prefix 232 and the pictogram postfix 233.

Further, the above pictogram of the first type can be automatically added to the specific text information. For example, the pictogram of waving one's hand as shown last in FIG. 8 may be automatically added to after the text information "later" shown in FIG. 8 and the word indicating the farewell such as "bye-bye", "see you", and "good-bye".

Embodiment 2

Figure 11:
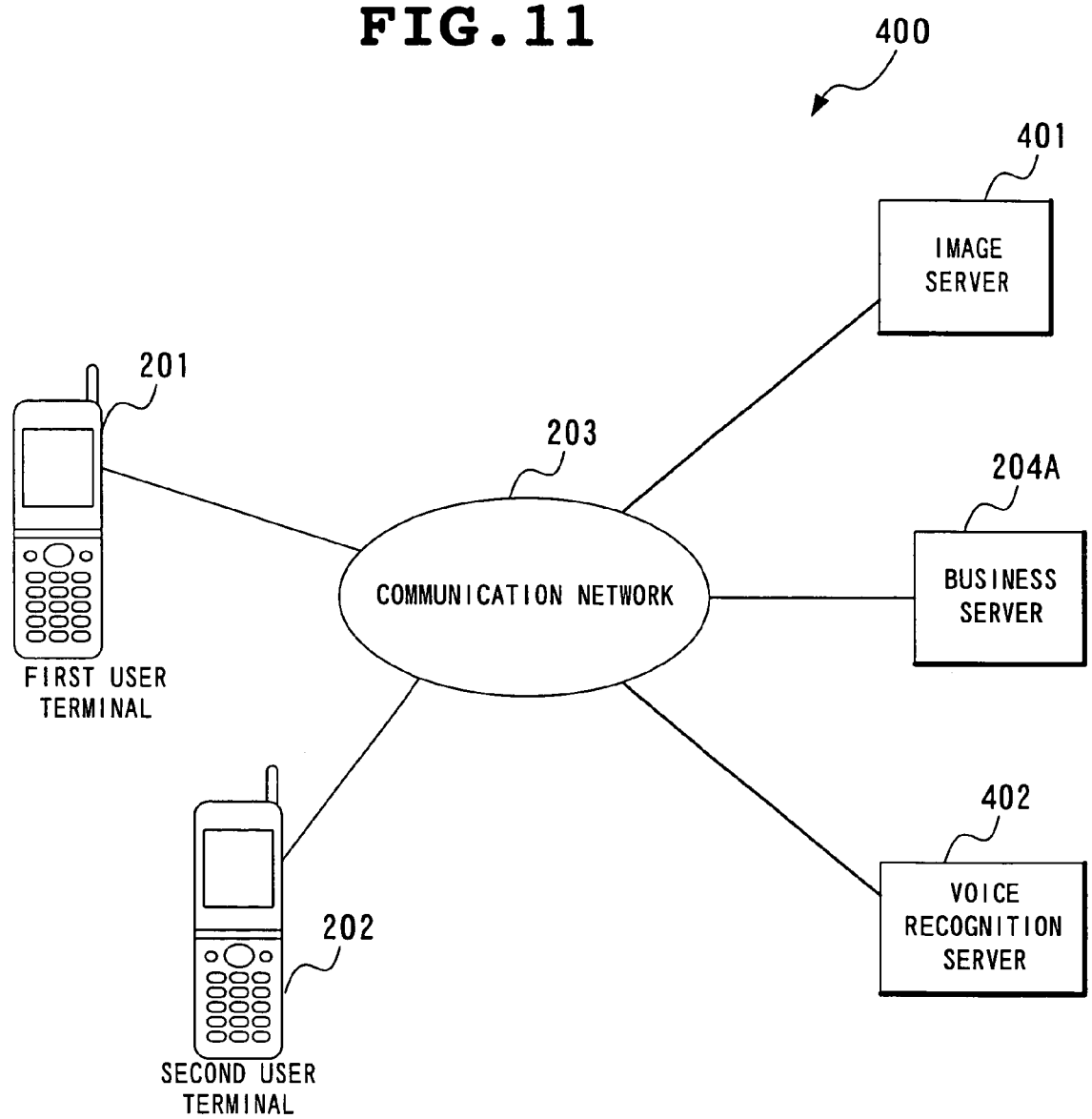
FIG. 11 is a constitutional view showing the outline of a communication system according to a second embodiment of the invention.

FIG. 11 shows the outline of a communication system according to a second embodiment. In this communication system 400, the same reference numerals are respectively attached to the same portions as in the first embodiment and their description is properly omitted. In the communication system 400 of the second embodiment, an image server 401 which works to transmit and receive an image and a voice recognition server 402 which recognizes voice and converts it into the text information are connected to the communication network 203, in addition to the business server 204A. The business server 204A manages the whole system when performing the communication between the first user terminal 201 and the second user terminal 202 with a service of converting the voice information of a TV phone into the text information. The voice recognition server 402 can recognize the voice and convert it into the text information at a high speed.

The first and second user terminals 201 and 202 respectively include cameras capable of picking up images at the intervals of comparatively short time and they are respectively provided with a TV phone function capable of communicating with voice while transmitting and receiving the moving images or the image strings like a picture-card show conforming to the moving images. The first user terminal 201 that is the calling end in the description has to be registered into the business server 204A to get a membership before receiving the service of this embodiment, as described in the first embodiment. When a specified agency itself handling portable phones runs the business server 204A, a user has only to make a contract of use of the user terminal with the portable phone handling agency.

In the communication system 400 of this embodiment, the first and the second user terminals 201 and 202 can transmit and receive the video information and the voice information at the present time, similarly to the ordinary TV phone. Besides, when the first user terminal 201 at the calling end has been previously registered into the business server 204A, one of the first and the second user terminals 201 and 202 can convert the voice information transmitted from the other party into the text information by pushing a specified key of the own user terminal, display it as subtitle on its display, and store the text information.

At this time, the text information may include a pictogram similarly to the first embodiment, or it may include only a character and a symbol without pictogram. The text information stored in the self-user terminal can be displayed on a display of the user terminal at a necessary time, or it may be edited into an electronic mail and transmitted to the self-computer or another computer of the other or a communication terminal such as a portable phone. Thus, the text information after voice recognition is separated from the image and the voice information requiring a memory of comparatively large capacity and it is stored, so that even a portable communication terminal could store and transfer the important data into a memory of comparatively small capacity.

Figure 12:
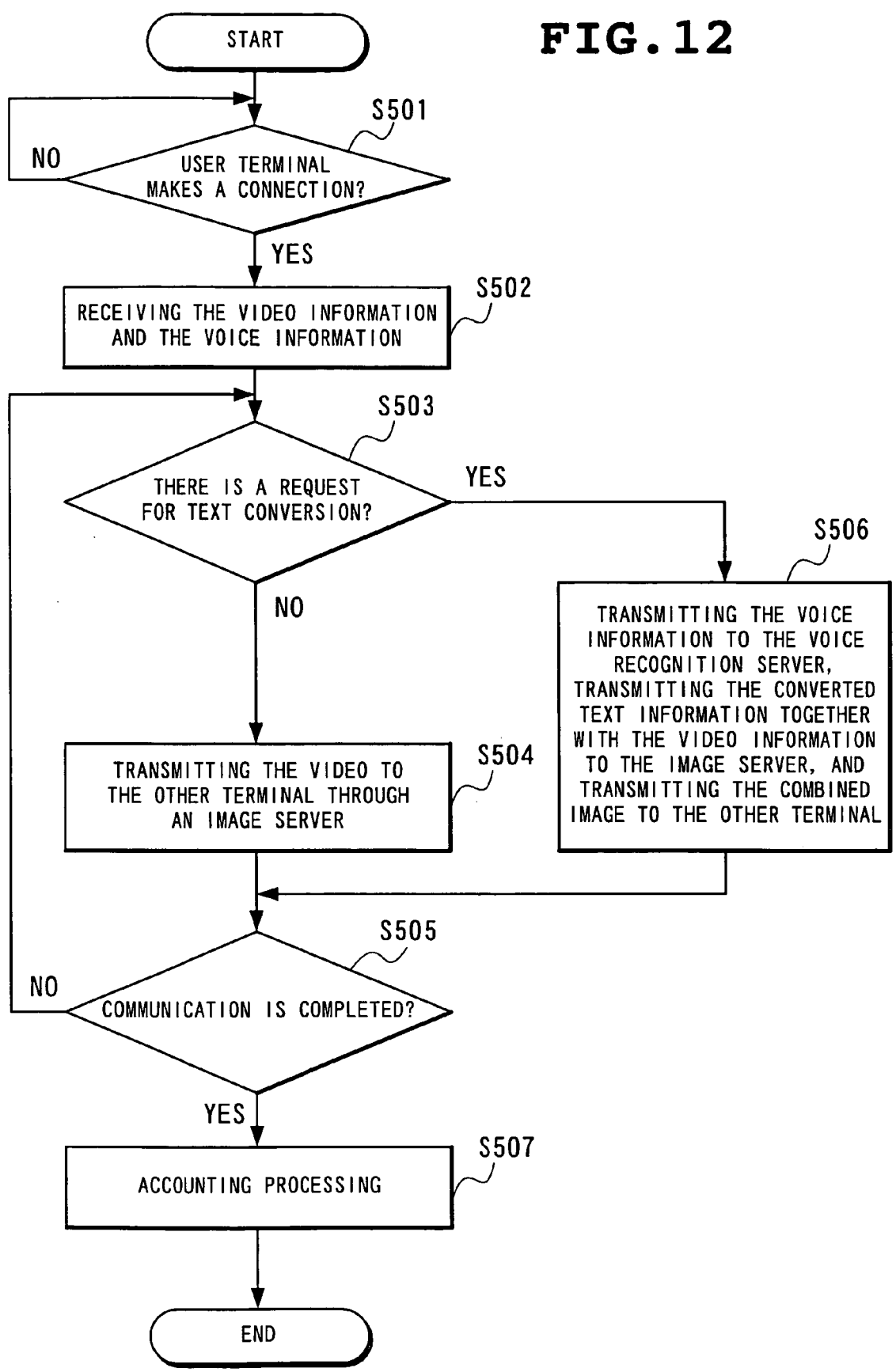
FIG. 12 is a flow chart showing the outline of a control of a business server according to the second embodiment.

FIG. 12 shows the outline of a control of a business server in the second embodiment. When the first user terminal 201 gains access to the business server 204A for TV phone communication (Step S501: Y), the user A transmits the video information and the voice information to the business server 204A from the point when the user B of the second user terminal 202 takes the call (Step S502). The business server 204A monitors whether a request for converting the voice information into the text information is transmitted from the first user terminal 201 (Step S503).

When the request for converting the voice into the text information does not come (N), the same processing as the ordinal TV phone for reproducing the video information and the voice is performed. Namely, in this case, the video information of a predetermined time unit transmitted from the first user terminal 201 is transmitted to the second user terminal 202 as the destination through the image server 401 (Step S504). In this case, the voice information is transmitted directly from the business server 204 to the second user terminal 202.

When the predetermined processing is performed, the business server 204A checks whether the communication through TV phone has been completed or not between the first user terminal 201 and the second user terminal 202 (Step S505). When the communication has not been completed (N), the processing is returned to Step S503 where it checks whether the first user terminal 201 has transmitted the request for converting the voice information into the text information.

For example, the case where the user A makes a TV phone call to the user B so to teach the user B how to cook his or her favorite dish is considered. When the first user terminal 201 is connected to the second user terminal 202, the user A exchanges ordinary greetings with the user B, and at this point, the video information and the voice information are transmitted from the first user terminal 201 to the second user terminal 202 as they are. The processing of converting the voice information into the text information is not performed. At a certain point, the user A tells the user B to let him or her teach the recipe and to record the contents and the user A operates a key, not illustrated, of the first user terminal 201. According to this, a request for converting the voice information into the text information is transmitted from the first user terminal 201 to the business server 204A.

Since the text conversion request comes (Step S503:Y), the business server 204A transmits the voice information which has been transmitted to the second user terminal 202 so far, to the voice recognition server 402. The voice recognition server 402 converts the transmitted voice information into the text information and transmits this text information a little delayed, together with the video information to the image server 401. The image server 401 combines the transmitted video information with the letters and the symbols as the text information on the lower half screen and thus obtained combined image is transmitted to the second user terminal 202 (Step S506).

This processing is performed for every predetermined time unit and at every time unit, whether the communication on the TV phone has been completed or not is checked (Step S505). Then, the processing is returned to Step S503. While the first user terminal 201 is transmitting the text conversion request to the voice recognition server 402, the text information into which the voice information of the recipe has been converted is displayed to the second user terminal 202 as the image. The user B can store the text information of the recipe into a memory, not illustrated, of the second user terminal 202.

Storing the text information can save the memory capacity much more than storing the voice information or the voice information with image. The text information may be automatically stored into the second user terminal 202, upon receipt of the control signal associated with the text conversion request transmitted by the user A, or the user B may store the text information through the key operation on the side of the second user terminal 202 according to the instruction of the user A, thereby storing necessary information efficiently. Thus obtained text information can be transmitted to a desired destination from the second user terminal 202 through electronic mail and the contents can be printed out by a printer. The user B can call for the stored contents on the display of the second user terminal 202 and cook the dish according to this.

When the processing of Step S506 is performed for a predetermined time unit, whether the communication on the TV phone has been completed or not is checked (Step S505). The processing is returned to Step S503. When the communication has not been completed and while the transmission of the converted text information to the second user terminal 202 is instructed, the user B can receive the recipe uttered by the user A as the character information.

When the request for converting the voice information into the text information is cancelled on the way of the communication (Step S503: N), the processing is returned to the ordinal TV phone of the video information and the voice information. When the communication has been completed (Step S505: Y), the business server 204A performs the accounting processing (Step S507) according to the duration of call and the time when the voice information is converted into the text information, and then communication on the TV phone is finished.

In the second embodiment, although the processing of the video information and the voice information transmitted from the first user terminal 201 to the second user terminal 202 has been described, the same processing can be performed on the video information and the text information transmitted from the second user terminal 202 to the first user terminal 201. Thus, the first user terminal 201 can receive the image with the video information transmitted from the user B to the user A combined with the text information.

In the second embodiment, when there is a request for converting the voice information into the text information, the voice information is not reproduced but the text information is displayed in the image. Differently from this, when there is the same request, it may be designed to display the text information in the image as well as to reproduce the voice information continuously in the other terminal. In order to do this processing, the voice information is transmitted not only to the voice recognition server 402 in Step S506 but also the voice information itself is transmitted to the user terminal of the other party on the TV phone so to continuously reproduce the voice information.

The business server 204A or the voice recognition server 402 can convert one portion of the text information into a pictogram and display it on the screen of the user terminal when it is provided with such a function of converting a predetermined object into a pictogram, similarly to the first embodiment.

Variation Example of the Second Embodiment

Figure 13:
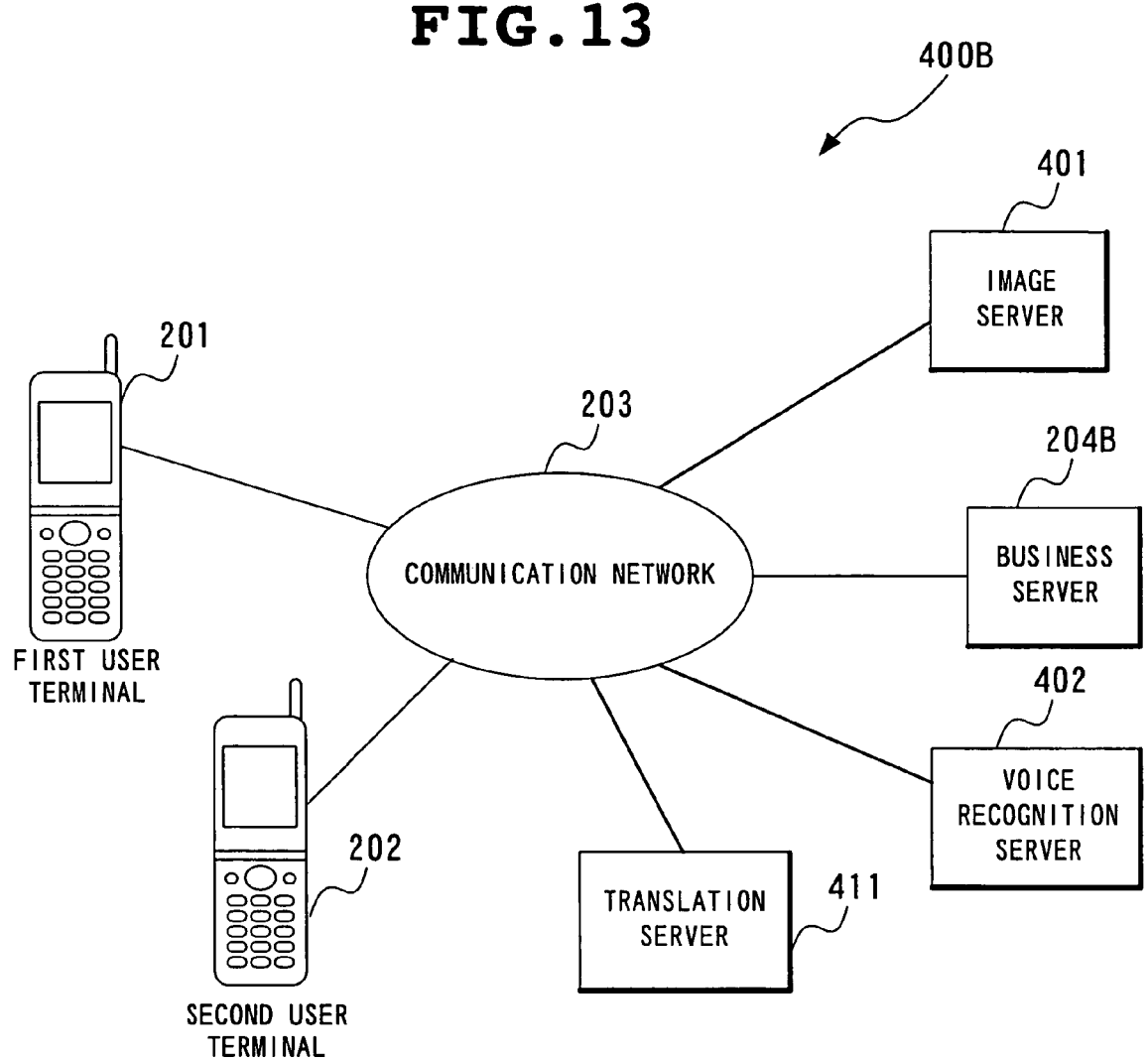
FIG. 13 is a constitutional view showing a variation example of the communication system of the second embodiment.

FIG. 13 shows a variation example of a communication system according to the second embodiment. The same reference numerals are attached to the same portions in FIG. 13 as in FIG. 11, and their description is properly omitted. The communication system 400B of the first variation has a translation server 411 in addition to the communication network 203. For example, assume that the user A having the first user terminal 201 is a Japanese and that the user B having the second user terminal 202 is a Russian.

In this case, when the user A makes a request for converting the information into the Russian text information, to the business server 204B, the business server 204B transmits the voice information transmitted from the first user terminal 201 to the voice recognition server 402 and converts it into the Japanese text information, and then, transmits this to the translation server 411 and converts it into the Russian text information. The image server 401 combines the text information with the video image, which is transmitted to the second user terminal 202.

According to this, the Russian user B can obtain the Russian text information corresponding to Japanese spoken by the user A on the screen and have a dialogue with a Japanese on the TV phone. In this case, the Russian uttered by the user B is finally converted in the Japanese text information and displayed on the first user terminal 201.

It is needless to say that the voice information converted into the text information of mother tongue of the other party can be returned to the original voice information. The converted text information can be combined with the pictogram, similarly to the first embodiment. Since the pictogram is often understood in common all over the world, frequent use of the pictogram can develop the TV phone communication smoothly.

Third Embodiment

Figure 14:
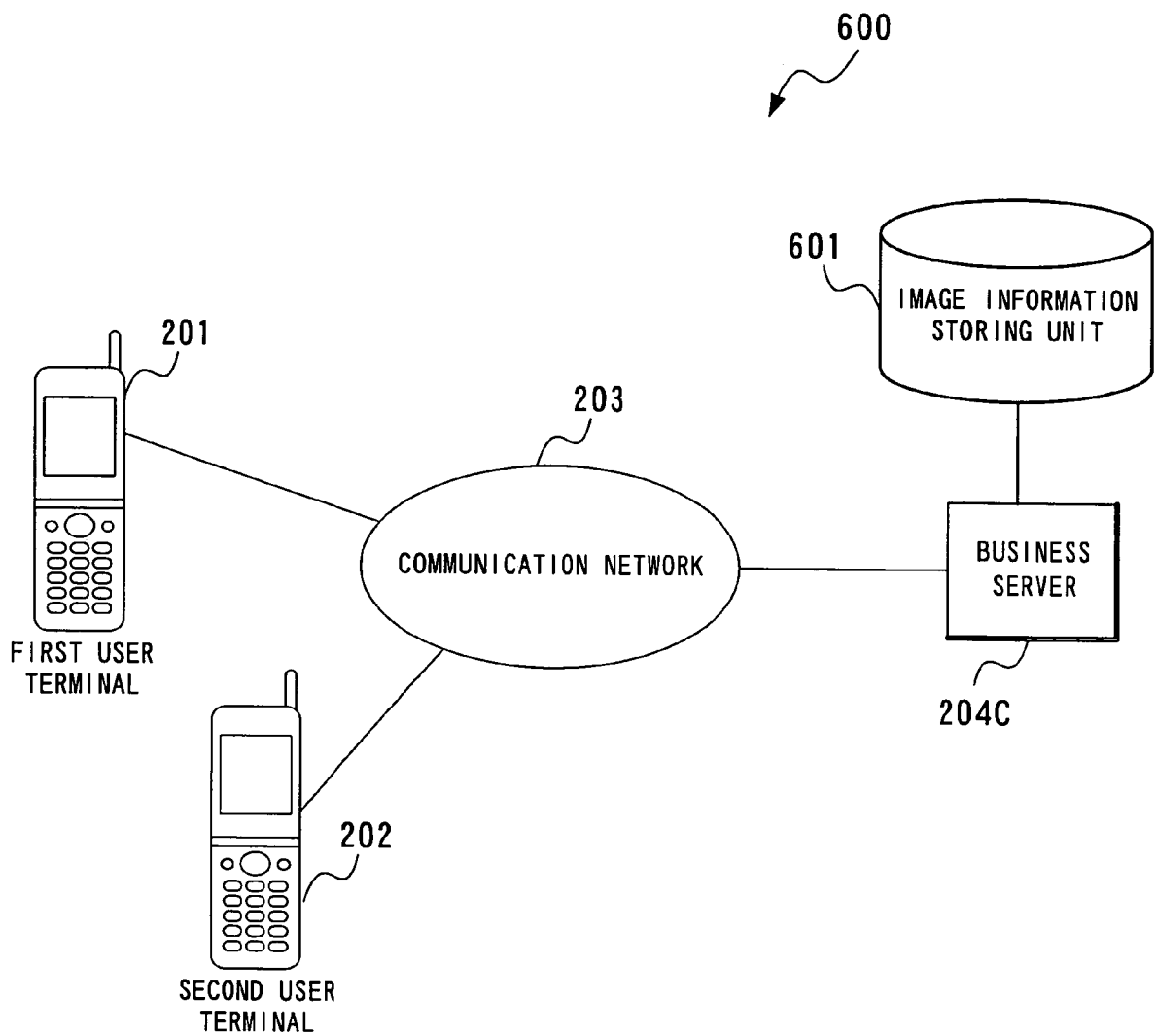
FIG. 14 is a constitutional view showing the outline of a communication system according to a third embodiment of the invention.

FIG. 14 shows the outline of a communication system according to a third embodiment of the invention. In FIG. 14, the same reference numerals are attached to the same portions as in FIG. 11, and their description is properly omitted. In the third communication system 600, an image information storing unit 601 is connected to the business server 204C connected to the communication network 203. The image information storing unit 601 is formed as an external storing unit such as a magnetic disk.

Figure 15:
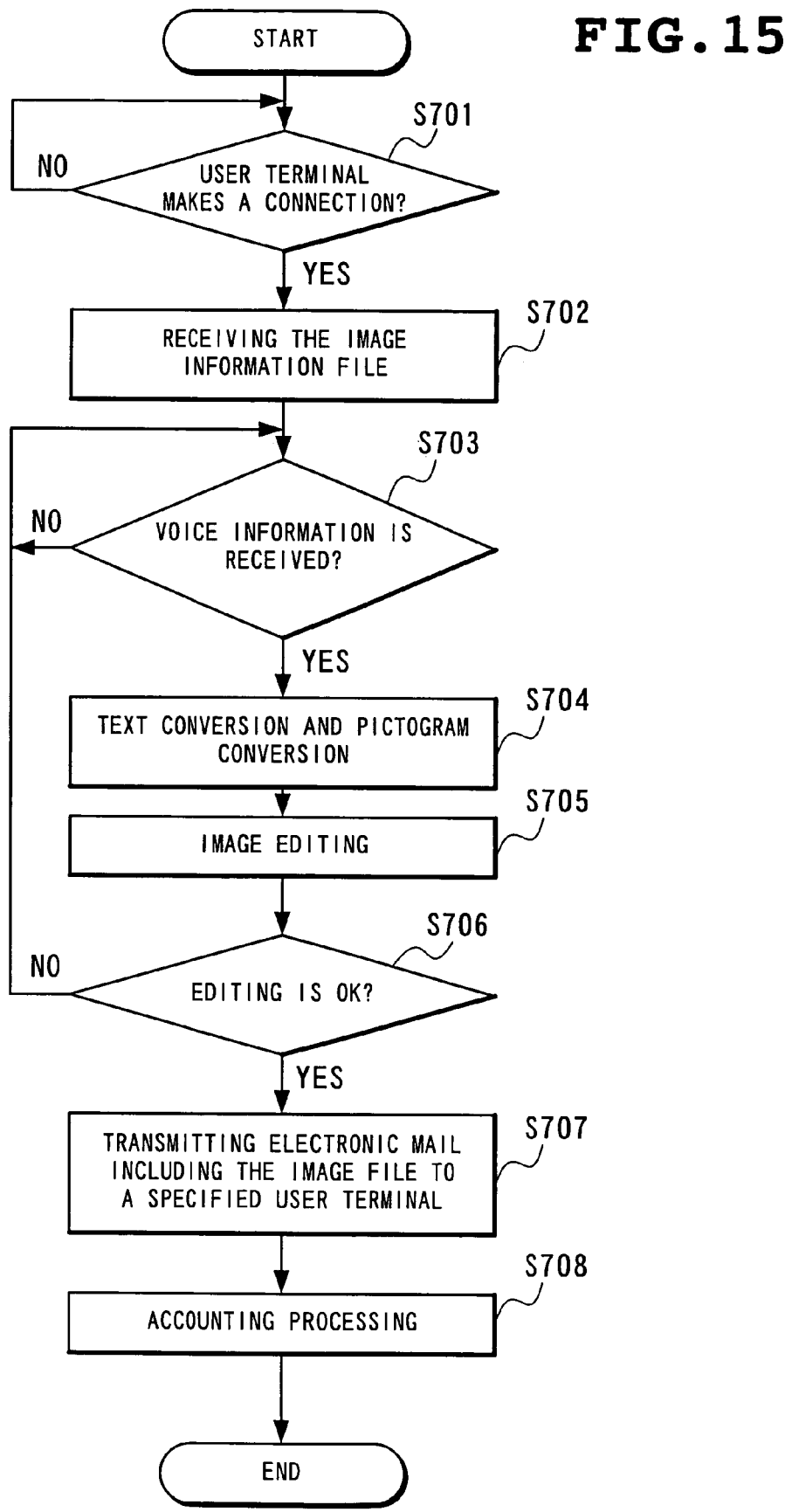
FIG. 15 is a flow chart showing the outline of a control of a business server according to the third embodiment.
Figure 16:
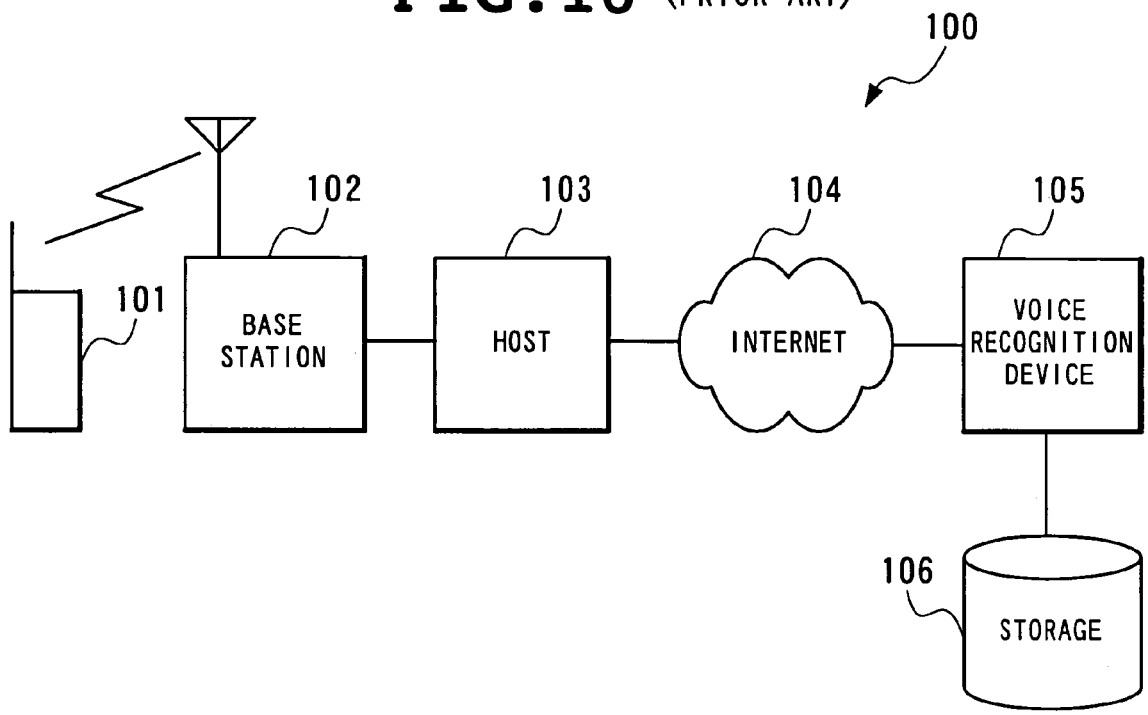
FIG. 16 is a constitutional view showing the outline of the communication system according to the first proposal.
Figure 17:
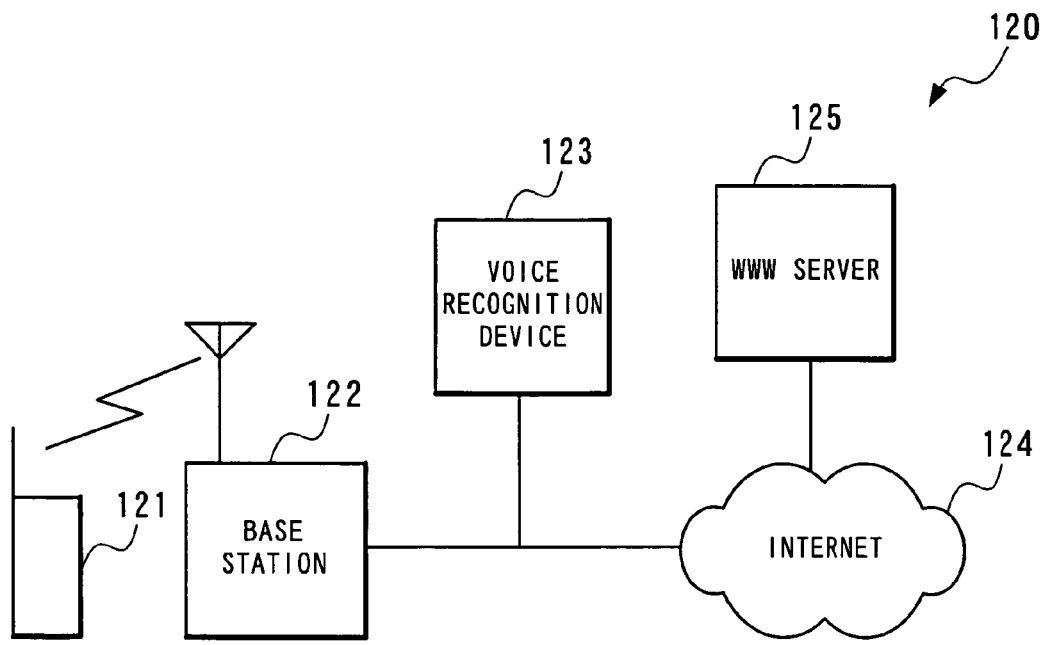
FIG. 17 is a constitutional view showing an important portion of the communication system according to the second proposal.

FIG. 15 shows the outline of a control of the business server according to the third embodiment. The description will be made in the case where the user A transmits the electronic mail including the image file to the second user terminal 202 by using the first user terminal 201. The business server 204C is in wait for a connection of the user terminal (Step S701) and when the first user terminal 201 makes a connection (Y), the transmitted image file is stored into the image information storing unit 601 (Step S702).

Thereafter, the user A transmits the voice information to be converted into text information and pictogram. Upon receipt of the voice information (Step S703: Y), the business server 204C converts this into text information similarly to the first embodiment and further converts the portion corresponding to a pictogram into the pictogram (Step S704). Then, it performs the image editing for combining the above text information and pictogram at the position the user A specified at the transmitting time (Step S705) of the voice information.

The editing result can be confirmed on the screen of the first user terminal 201 having access to the business server 204C. Namely, in the case of a static image, the user A confirms whether the properly-converted text information and pictogram are displayed at each proper position as for the voice information the user A transmitted in Step S703. In the case of a moving image, for example, when characters are inserted in its title, the user A checks whether the voice information for specifying the title has been properly converted and displayed. Text or pictogram can be inserted into a frame of the moving image. In this case, since the voice information for specifying the inserting position is transmitted to the business server 204C, the user A checks whether this has been properly converted or not.

When the result of the image editing cannot be approved (Step S706: N), the processing is returned to Step S703, where all or one of the text information or the pictogram is corrected or added according to the input of the voice information (Step S703: Y). An instruction of the editing contents and a predetermined input item such as selection of the user A in Step S706 can be performed by the operation of the keys provided in the first user terminal 201.

When the image editing can be approved or image information has been satisfactorily edited as the result of the re-editing of the image (Steps S706: Y), the electronic mail with the image file including the edited image information is transmitted to the second user terminal 202 of the user B specified by the user A (Step S707). Thereafter, the accounting processing depending on the processing contents of the editing is performed (Step S708). Needless to say, it is possible to display the name of a sponsor or the name of a product a sponsor sells as the text information or logo of a company in the static image or one of the moving image. In this case, the accounting processing is not to be performed on the user A.

As mentioned above, when the user A transmits the static image or the moving image previously prepared to the destination, he or she once transmits it to the business server 204C, where it is converted into the text information, and the character and the pictogram built in the image can be transmitted to the destination without entering the individual characters.

Variation Example of the Third Embodiment

In the third embodiment described above, although editing of the image information is performed on the side of the business server 204C, only the voice information may be transmitted to the business server 204C to be converted into the corresponding text information and pictogram and the result may be returned to the first user terminal 201, where the image editing may be performed. In this case, the image file having been edited is transmitted to the business server 204C and then transmitted to the second user terminal 202.

In the above mentioned embodiment and variation, the pictogram prefix 232 for identifying the head of a pictogram and the pictogram postfix 233 for identifying its end are used or a soundless portion is used so to specify the portion of the pictogram, in converting the voice information into a pictogram. Besides, after analysis of the whole sentence, a pictogram may be automatically added from the voice information with no specification of pictogram, according to the mode specified by a user (a mode of a lot of use of pictograms and a mode of automatically adding a pictogram indicating a predetermined repetitive word such as meal exclusively). The mode specified by a user may include a mode of representing one's feeling such as a lovers' mode and a business mode and a mode of restraining one's feeling. In the case of the mode of representing one's feeling, an inflection of an utterer is analyzed and in the case where there exist a plurality of pictograms corresponding to the same word, each pictogram may be selectively used.

According to the invention as mentioned above, not only the voice information is converted into the text information, but also the pictogram corresponding information is extracted from the voice information and the pictogram corresponding information is converted into each corresponding pictogram. Thus, in the case of a communication system of using a lot of pictograms such as portable phone, operationality can be improved and information including the pictogram as ever can be transmitted at real time or almost real time.

Since a pictogram, in combination with the text information, can be used not only in the electronic mail but also at a time of TV conference and at a time of transmitting an image file, it is possible to understand the information to be transmitted instinctively. Further, it is possible to grasp the feeling of a person transmitting information. Especially, pictogram resembles hieroglyph, so the persons different in language can accurately share its meaning. Therefore, the minimum communication can be established speedily between the persons different in mother tongue by converting the voice information not only into the text information but also into the information including a pictogram.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An information transmission system comprising:
    a voice input unit which receives the contents of communication with voice;
    an information converting unit which converts the voice information received by said voice input unit into text information;
    a pictogram conversion table which registers said pictogram and a pictogram corresponding information indicating a pictogram, and a pictogram prefix for identifying the head of said pictogram, which pictogram prefix is blank period of a predetermined time;
    a pictogram converting unit which detects said pictogram prefix from the text information obtained through the conversion by said information converting unit, extracts said pictogram corresponding information following said pictogram prefix from the text information, and converts the extracted pictogram corresponding information extracted by said pictogram corresponding information extracting unit into each corresponding pictogram by using said pictogram conversion table;
    a type judging unit which judges whether each of the pictogram corresponding information to be converted by said pictogram converting unit is at least one of a first type pictogram to put an accent on a usual sentence and a second type to replace the pictogram with a specific word or sentence of text; and
    a pictogram conversion inhibiting unit which inhibits the conversion into a pictogram by said pictogram converting unit as for a destination of information where the above conversion is inhibited, deletes the text information corresponding to said first type pictogram, and leaves the text information corresponding to said second type pictogram as it is.

2. The information transmission system as set forth in claim 1, wherein
    said contents of communication correspond to a body text of an electronic mail.

3. The information transmission system as set forth in claim 1, further comprising:
    an address table in which each pair of destination reading information including name of destination or reading of the name (designation) and address information corresponding to said destination is registered;
    an address table searching unit which searches said address table for proper one of said destination reading information, that corresponds to the information at a specified position of the text information received by said voice input unit and obtained through the conversion by said information converting unit; and
    a destination setting unit which sets the corresponding address information as the destination of said text information when the proper one of said destination reading information is found by said address table searching unit.

4. The information transmission system as set forth in claim 1, further comprising:
    a language specifying unit which specifies a language corresponding to a destination; and
    a translating unit which translates the text information converted by said pictogram converting unit into the language specified by said language specifying unit.

5. The information transmission system as set forth in claim 1, wherein the corresponding information indicating a pictogram from the text information obtained through the conversion by said information converting unit comprises a pictogram prefix and a pictogram postfix.

6. An information transmission system comprising:
    a voice input unit which receives the contents of communication with voice;
    an image input unit which receives image information that is the contents to be transmitted associated with the voice information received by said voice input unit;
    an information converting unit which converts the voice information received by said voice input unit into text information;
    a pictogram conversion table which registers said pictogram and a pictogram corresponding information indicating a pictogram, and a pictogram prefix for identifying the head of said pictogram, which pictogram prefix is blank period of a predetermined time;
    a pictogram converting unit which detects said pictogram prefix from the text information obtained through the conversion by said information converting unit, extracts said pictogram corresponding information following said pictogram prefix from the text information, and converts the extracted pictogram corresponding information extracted by said pictogram corresponding information extracting unit into each corresponding pictogram by using said pictogram conversion table;
    an information transmitting unit which combines the mixed information of pictogram and text obtained through the conversion by said pictogram converting unit with the image information received by said image input unit and transmits the above information;
    a type judging unit which judges whether each of the pictogram corresponding information to be converted by said pictogram converting unit is at least one of a first type pictogram to put an accent on a usual sentence and a second type to replace the pictogram with a specific word or sentence of text; and
    a pictogram conversion inhibiting unit which inhibits the conversion into a pictogram by said pictogram converting unit as for a destination of information where the above conversion is inhibited, deletes the text information corresponding to said first type pictogram, and leaves the text information corresponding to said second type pictogram as it is.

7. The information transmission system as set forth in claim 6, further comprising:
    an address table in which each pair of destination reading information including name of destination or reading of the name (designation) and address information corresponding to said destination is registered;
    an address table searching unit which searches said address table for the proper one of said destination reading information that corresponds to the information at a specified position of the text information received by said voice input unit and obtained through the conversion by said information converting unit; and
    a destination setting unit which sets the corresponding address information as the destination of said text information when the proper one of said destination reading information is found by said address table searching unit.

8. The information transmission system as set forth in claim 6, further comprising:
    a language specifying unit which specifies a language corresponding to a destination; and
    a translating unit which translates the text information converted by said pictogram converting unit into the language specified by said language specifying unit.

9. The information transmission system as set forth in claim 6, wherein
    said information transmitting unit, each provided correspondingly in a plurality of said voice input units, realizes a TV phone by exchanging images and the pictogram/text mixed information between users for every unit of said voice input units.

10. The information transmission system as set forth in claim 6, wherein the corresponding information indicating a pictogram from the text information obtained through the conversion by said information converting unit comprises a pictogram prefix and a pictogram postfix.

11. An information transmission method comprising the steps of:
    a step of registering a pictogram and a pictogram corresponding information indicating said pictogram, and a pictogram prefix for identifying the head of said pictogram as a pictogram conversion table, which pictogram prefix consists is blank period of a predetermined time;
    a voice input step for receiving the contents of communication with voice;
    an information converting step for converting the voice information received through said voice input step into text information;
    a pictogram converting step of detecting said pictogram prefix from the text information obtained through the conversion by said information converting unit, extracting said pictogram corresponding information following said pictogram prefix from the text information, and converting the extracted pictogram corresponding information extracted through said pictogram corresponding information extracting step into each corresponding pictogram by using said pictogram conversion table;
    a type judging step for judging whether each of the pictogram corresponding information to be converted through said pictogram converting step is at least one of a first type pictogram to put an accent on a usual sentence and a second type to replace the pictogram with a specific word or sentence of text; and
    a pictogram conversion inhibiting step for inhibiting the pictogram conversion of said pictogram converting step as for a destination of information where the above conversion is inhibited, deleting the text information corresponding to said first type pictogram, and leaving the text information corresponding to said second type pictogram as it is.

12. The information transmission method as set forth in claim 11, further including
    an address table searching step for searching an address table, with each destination reading information including name of destination or reading of the name (designation) and each address information corresponding to a destination registered in pair, for the proper destination reading information that corresponds to the information at a specified position of the text information received through said voice input step and obtained through the conversion in said information converting step, and
    a destination setting step for setting the corresponding address information as the destination of said text information when the proper one of said destination reading information is found through said address table searching step.

13. The information transmission method as set forth in claim 11, further including
    a language specifying step for specifying a language corresponding to a destination, and
    a translating step for translating the text information converted through said pictogram converting step into the language specified through said language specifying step.

14. The information transmission method as set forth in claim 11, wherein the corresponding information indicating a pictogram from the text information obtained through the conversion by said information converting unit comprises a pictogram prefix and a pictogram postfix.

* * * * *